United States Patent [19]

Hardison et al.

[11] Patent Number: 5,249,433
[45] Date of Patent: Oct. 5, 1993

[54] METHOD AND APPARATUS FOR PROVIDING REFRIGERATED AIR

[75] Inventors: Edward R. Hardison, Niagara Falls, Canada; Randolph S. Coo, Grand Island, N.Y.

[73] Assignee: Niagara Blower Company, Buffalo, N.Y.

[21] Appl. No.: 850,098

[22] Filed: Mar. 12, 1992

[51] Int. Cl.$^5$ .............................................. F25D 21/10
[52] U.S. Cl. ............................................ 62/282; 62/82
[58] Field of Search ............... 62/272, 274, 282, 285, 62/80, 82

[56] References Cited

U.S. PATENT DOCUMENTS

| | | | |
|---|---|---|---|
| 2,286,618 | 6/1942 | Hiller | 62/282 |
| 2,943,460 | 7/1960 | Brown | 62/272 |
| 3,169,381 | 2/1965 | Persson | 62/82 |
| 3,258,207 | 6/1966 | Cody | 239/294 |
| 3,772,897 | 11/1973 | Masuda | 62/282 |

FOREIGN PATENT DOCUMENTS

920602 9/1964 U.S.S.R. .................... 62/82

Primary Examiner—Albert J. Makay
Assistant Examiner—William C. Doerrler
Attorney, Agent, or Firm—Niro, Scavone, Haller & Niro

[57] ABSTRACT

This invention relates to an apparatus for continuously providing low temperature refrigerated air for freezing and storage of food products, wherein process air is refrigerated by passing over an evaporator coil. Frost build-up on the evaporator coil is removed by periodically spraying the evaporator coil with a food-grade propylene glycol solution. Entrained liquid propylene glycol droplets are removed as the process air passes through a primary mist eliminator, composed of a series of corrugated plates, and an auxiliary mist eliminator, composed of a flat sheet of woven wire mesh incased between two flat sheets of diamond mesh. The use of demisters enables operation at high air face velocities, which in turn reduces equipment size and increases heat transfer coefficients, resulting in lower heat transfer surface area requirements.

61 Claims, 4 Drawing Sheets

METHOD AND APPARATUS FOR PROVIDING REFRIGERATED AIR

BACKGROUND OF THE INVENTION

1. Field of the Invention

Our invention relates generally to low temperature mechanical refrigeration systems and, more specifically, systems which quick freeze and/or store food products, such as novelty ice cream products. Such systems typically include a hardening tunnel through which the products pass on a conveyor system. As such products pass through the hardening tunnel, low temperature air is passed over the product to blast freeze it. The temperature of the air passing over the product must be maintained constant to maintain uniformity in the appearance and condition of the product. Any foreign substance added to the system during operation must not contaminate the food products. Finally, bacterial contamination of the product must be prevented. Our invention provides a novel method that does not affect the normal continuous operation of the refrigeration system, thereby obviating the necessity for frequent defrosting. It uses intermittent, frequent spraying of the external surface of the evaporator coil of such a system with a food-grade aqueous propylene glycol solution to provide essentially frost-free continuous operation.

Because moisture is present in such refrigeration systems, over time, evaporator coils become coated with a build-up of frost causing reduced unit capacity and decreased air flow. Frost build-up also decreases product load capability per ton of compressor capacity. In a typical system, the evaporator coils must defrosted frequently. Our invention also provides an apparatus for defrosting that maintains high air velocity throughout, thereby reducing the size of the equipment. The high air velocities also increase heat transfer coefficients in the evaporator coil area, thus reducing the evaporation surface area required for a given cooling capacity.

2. Description of the Prior Art

Known techniques for defrosting the evaporator coils have serious shortcomings. For example, one popular response to the build-up of frost on evaporator coils is to apply heat, in the form of hot gasses, to the coils to melt the frost. This approach is disclosed in U.S. Pat. No. 3,922,875 (Morris), which claims a reversible cycle refrigeration system. There, the refrigeration system is cycled alternatively through a cooling phase and a defrosting phase. During the cooling phase, liquid refrigerant is supplied to the evaporator coils for cooling. In the defrosting phase, the cold refrigerant supply is stopped and hot gaseous refrigerant from the high pressure discharge of the compressor is routed to the evaporator coil to melt the frost. A similar system was disclosed in U.S. Pat. No. 4,736,594 (Pao).

Such cyclic defrosting systems have several disadvantages. First, additional energy is required to heat the gaseous refrigerant during the defrosting phase. Second, additional refrigeration is then required to remove the heat transferred to the evaporator coil and the unit casing by the hot refrigerant gas used to defrost the evaporator coil. This decreases overall thermal efficiency. Third, in these systems no provision is made to remove any bacteria which may be introduced into the system during defrosting. Fourth, such units must be shut-down during the defrosting operation, resulting in loss of valuable production time. Finally, repeated heating and cooling of the evaporator coils can cause thermal fatigue, material stresses, and premature failure. Thus, the evaporator coils in such systems must be replaced frequently.

A second approach to the problem of frost build-up, a refrigeration system which uses sprayed glycol, or a similar solution, to defrost the evaporator coil is disclosed in U.S. Pat. No. 3,300,993 (Schlemmer). In that system, frost is removed from the evaporator coil by continuously spraying a propylene glycol or brine solution over the coil. The solution trickles down the coil and is collected in a sump. This system must operate at low air velocities to prevent carry-over of the solution. Therefore, it must be sized to accommodate the large air ducts necessary to provide the low air velocities required to prevent glycol entrainment. Such low air velocities inherently reduce the overall heat transfer film coefficient outside the evaporator tubes, thus necessitating increased surface area.

Similarly, U.S. Pat. No. 3,805,538 (Fritch et al.), discloses an apparatus and method for freezing food items in three stages The second stage subjects the items to a blast of refrigerated air. In this stage, the evaporator coil is sprayed with a propylene glycol solution which drips to the floor where it is collected. Any solution entrained in the air is removed by gravity as the air is subsequently decelerated from about 540 fpm. to about 260 fpm. when the diameter of the duct section suddenly increases. This sudden reduction and subsequent increase in air velocity increases the required fan horsepower. Like the system disclosed by Schlemmer, the air velocity must be relatively low throughout in order to limit carry-over of the glycol solution.

Both of the previously disclosed approaches to the problem of frost build-up have serious flaws. The cyclic defrost systems must be shut down periodically to allow hot refrigerant gas to defrost the evaporator coil. Previously-known glycol spraying systems cannot be operated at high air velocities, or at the least must include sudden decreases in air velocity which increase the power needed to operate the system.

SUMMARY OF THE INVENTION

One of the objects of an embodiment of our invention is to provide a low height, compact horizontal refrigeration and defrosting system capable of operating at high air velocities to provide continuous steady state refrigeration with constant system capacity and room dry bulb temperature.

Another object of our invention is to increase product load capability and duration of continuous operation.

Yet another object of our invention is to provide a more efficient system per ton of compressor capacity compared to conventional refrigerant gas defrosting systems.

A further object of our invention is to provide an evaporator coil and spray chamber that act as an airwasher, thus reducing airborne particles and contaminants, including bacteria such as Listeria, Salmonella and Yersinia.

Another object of this invention is to provide a system which operates under much smaller temperature variations, thereby reducing thermal stresses in the evaporator coil.

Another object of our invention is to provide a system that uses a food grade aqueous propylene glycol solution as a liquid defrosting to defrost the evaporator coils so that, if, in the unlikely event there is any carryover of the glycol, it will not contaminate the food products being frozen.

A still further object of our invention is to provide a method and apparatus capable of operating at high air velocities throughout, this reducing both the physical size of the equipment and the heat transfer surface area required in the evaporator coil.

Other objects and features of our invention will become apparent upon examination of the following specification and drawings, together with the claims. Our invention is described below in connection with certain preferred or illustrative embodiments. These embodiments, however, are not intended to be exhaustive or limiting of our invention.

1. Horizontal Spray Cooler

In one embodiment, our invention is directed to an apparatus for removing frost from the evaporator coils of a refrigeration system which includes a spray cooler in a horizontal configuration. Providing the spray cooler in the horizontal position permits especially compact construction and high process air velocities. The spray cooler includes an evaporator coil over which process air passes, means for spraying a liquid defrosting solution onto the evaporator coil, demisting means for eliminating any droplets of liquid defrosting solution entrained in the process air, a fan or blower propel the process air, damper means to permit a portion of the process air to bypass the evaporator coil during defrosting, and a drain to remove the liquid defrosting solution to a concentration/regeneration system.

The spraying means may include a plurality of spray pipes, each having a plurality of spray nozzles located thereon, with the spray pipes and spray nozzles being spaced to ensure that the liquid defrosting solution sprayed therefrom completely covers the evaporator coil to absorb any accumulated frost. The demisting means typically changes the direction and velocity of the process air, thus collecting any liquid defrosting solution droplets entrained therein.

The demisting means may further comprise a primary eliminator composed of a series of corrugated plates compressed together forming zig-zag passages for the air to pass through. The corrugated plates are inserted into mating notches in the eliminator end plates, forming a primary eliminator. The entire primary eliminator assembly lies in a channel frame. Additionally, auxiliary demisting means may be included, comprising a flat sheet of woven wire mesh encased between two flat sheets of diamond mesh. in a frame structure.

2. Vertical Spray Cooler

Figure 11:
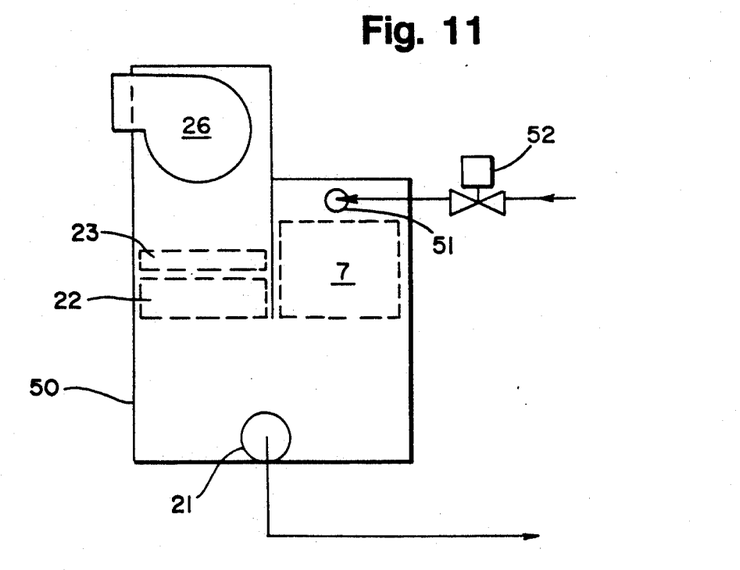
FIG. 11 is a side elevation of the vertical spray cooler.

In another embodiment, the spray cooler is provided in a vertical position. The vertical spray cooler contains similar spray means and demisting means for eliminating any airborne liquid defrosting solution droplets as are contained in the horizontal spray cooler. In the vertical spray cooler, however, the process air enters the top of the spray cooler rather than the side, as in the horizontal spray cooler. The process air is then drawn over the evaporator coil in a substantially vertically downward direction before making a 180° turn to enter the demister in a substantially vertically upward direction, as shown in FIG. 11, which allows the natural force of gravity to aid in the removal of entrained liquid defrosting solution. The spray pipes and spray nozzles are arranged such that the air velocity and the force of gravity insures that the liquid defrosting solution sprayed from the nozzles completely covers the evaporator coil.

After the process air completes the 180° turn, it encounters the primary and auxiliary mist eliminators, as in the horizontal spray cooler. In the vertical spray cooler, the drain connection is located at the bottom of the 180° turn so that the liquid defrosting solution will be easily collected. After the process air has passed through the primary and auxiliary mist eliminators, it enters the suction of the fan or blower and is discharged to the conditioned process space.

In many food applications, such as the preparation of frozen ice cream novelties, a preferred liquid defrosting solution is an aqueous solution of food grade propylene glycol. The following detailed description of our invention, therefore, refers to the use of such a solution. We do not thereby intend our description to foreclose the use of other suitable liquid defrosting solutions.

DETAILED DESCRIPTION OF THE INVENTION

1. Horizontal Embodiment

Figure 1:
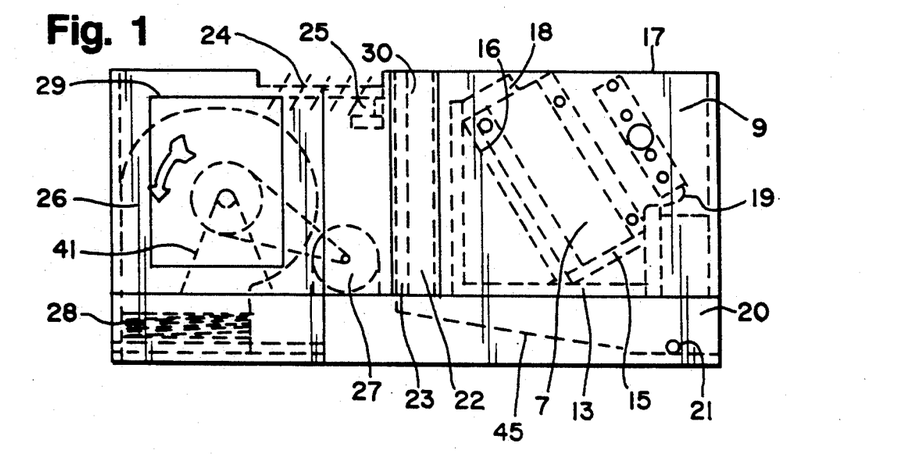
FIG. 1 is a side elevation of the horizontal spray cooler.

FIG. 1 illustrates a horizontal spray cooler for providing refrigerated air. It comprises six principal sections: a spray section, an evaporator coil section, a demisting section, a fan or blower section, a damper section and a drain pan section.

Figure 3:
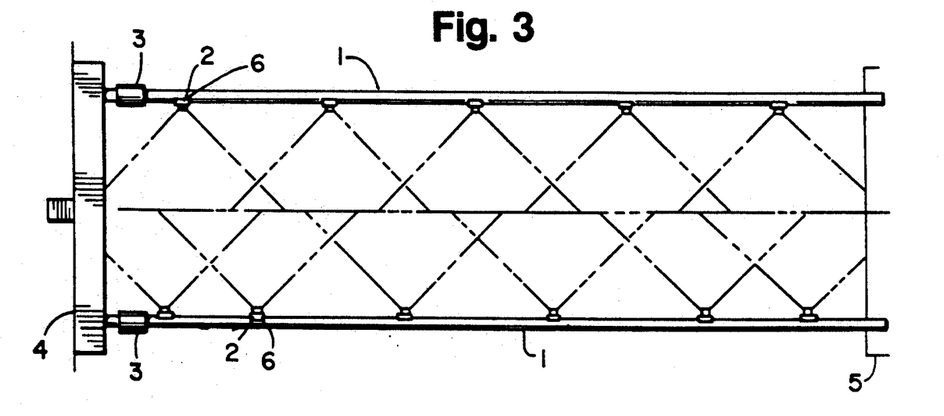
FIG. 3 is a detail of the spray assembly.

The spray section, as illustrated in FIG. 3, is normally composed of two (2) spray pipes 1 (i.e. one set) with multiple VeeJet® ½ HU 95-50 spray nozzles 2, or equal, and mating ½ in. half couplings 6 opposing one another, a minimum of two (2) couplings 3 (i.e. one set per set of spray pipes 1), a spray header box 4 and a spray pipe hanger 5. VeeJet® nozzles are manufactured by Spraying Systems Company of Wheaton, Ill. Comparable spray nozzles may be substituted. A spray system manufactured according to this invention may contain multiple sets of spray pipes 1, depending on the width of the evaporator coil 7. The maximum distance between the spray pipes is between approximately 10 inches and 14 inches, preferably about 1 foot, measured between opposing nozzles.

Figure 2:
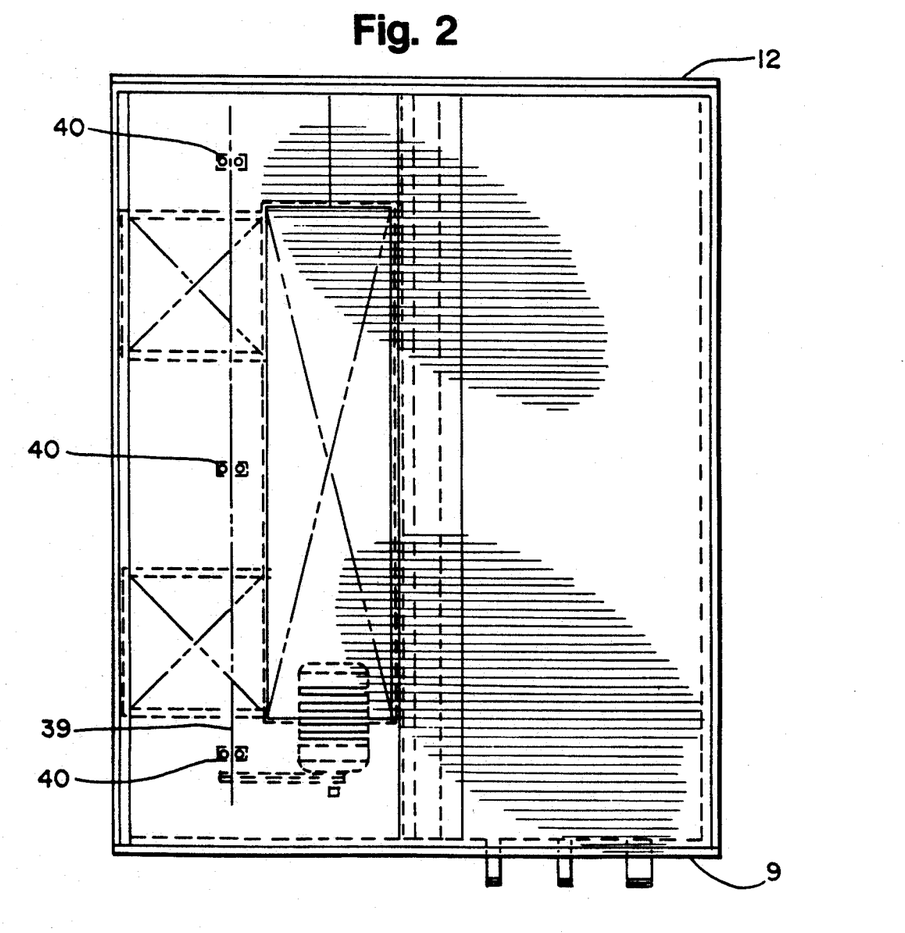
FIG. 2 is a top view of the horizontal spray cooler.
Figure 4:
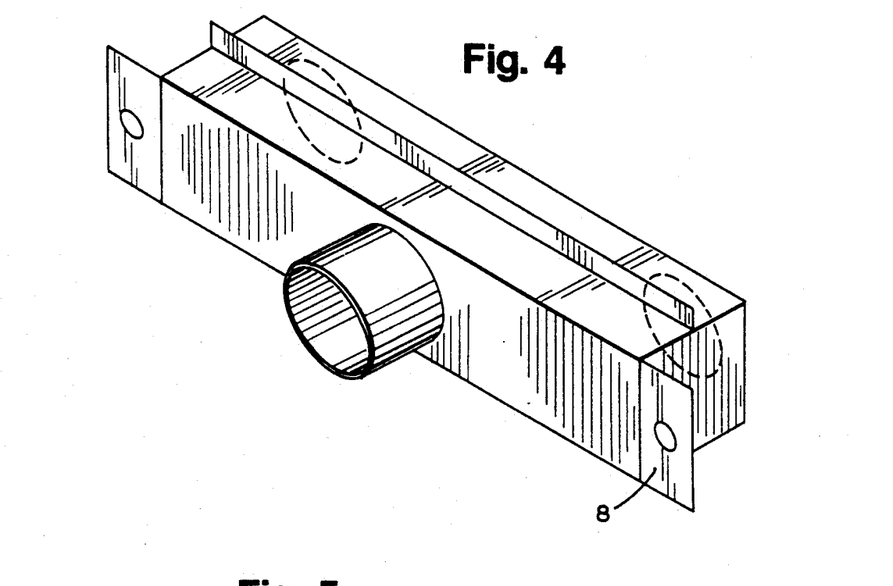
FIG. 4 is a detail of the spray header box.
Figure 5:
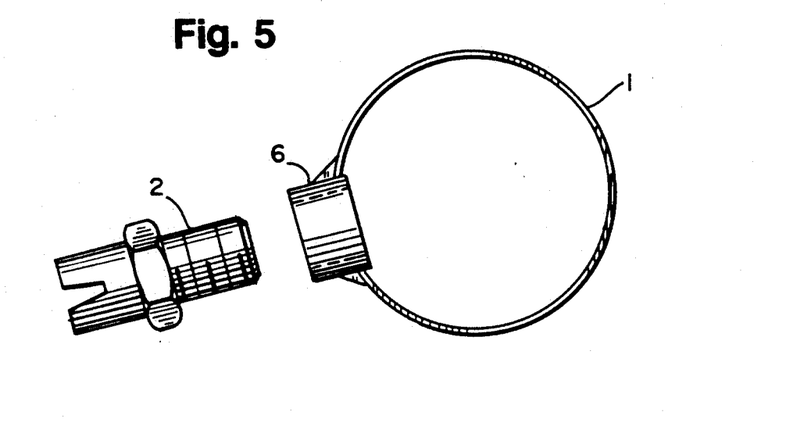
FIG. 5 is a detail of the spray nozzle assembly.
Figure 6:
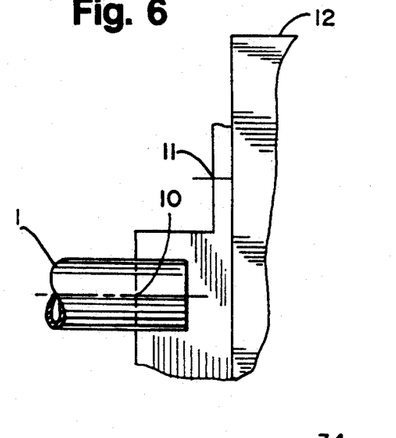
FIG. 6 is a detail of the spray pipe hanger.

As best shown in FIG. 4 the ends of the spray header box 4 have flanged tabs s which point outwardly. These flanged tabs 8 allow the spray header box 4 to be easily bolted, on an incline parallel to the face of the evaporator coil 7, to the side panel 9 of the coil casing as shown in FIG. 2. The ½ in. half couplings 6 are welded to the spray pipe 1 providing a threaded connection for the spray nozzles as illustrated in FIG. 5. FIG. 6 shows that the spray pipe hanger 5 may be formed in a 'Z' shaped pattern with the lower section 10 housing the apertures for the spray pipes 1 to lay in. The upper section 11 provides a flanged surface for bolting the spray pipe hanger 5 to the side panel 12 of the coil casing. The spray pipes 1 are connected to the spray header box 4 by means of the couplings 3.

Figure 7:
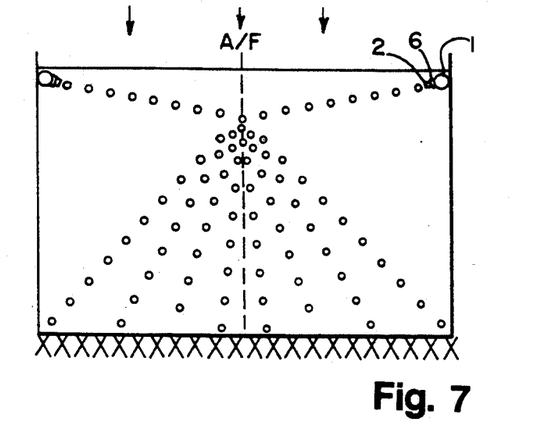
FIG. 7 is a detail of the spray pattern.

The evaporator coil 7 is defrosted periodically, preferably at intervals of about 60 minutes, with a food grade aqueous propylene glycol solution via the spray section, as described above, thus providing essentially frost free, continuous operation. The spray nozzles 2 are preferably capable of spraying the aqueous propylene glycol solution at viscosities as high as 3000 ssu, at a typical operating temperature of −25° F., while maintaining a high impact solid flat 'V' shape spray pattern. The spray nozzles 2 are configured in a novel geometric interference pattern which in combination with the inherent air velocity over the evaporator coil 7 results in a spray pattern covering the entire evaporator coil surface. The opposing spray nozzles 2 are staggered so as to create a constant plane of interference, as illustrated in FIGS. 3 and 7. More specifically, as shown in FIG. 7, aqueous propylene glycol particles 80 from facing nozzles 2 collide at an intersection plane 81 approximately equidistance from either nozzle and substantially parallel to the air flow path. The collision further atomizes the aqueous propylene glycol particles, providing a fine mist of droplets 82 which forcefully impinges upon the coils surface 83.

At optimum aqueous propylene glycol solution viscosity used and optimum fluid pressure, we have found that the nozzles should be spaced on approximately 5½ inch to 7½ inch centers, preferably about 5½ inch centers. As shown in FIG. 7, the resultant spray pattern fully covers the coil surface 83, providing complete defrosting.

The evaporator coil section comprises the evaporator coil mounting frame 13, a splash baffle 19, block-off plates and a fin tube or other extended surface evaporator coil 7. The evaporator coil mounting frame 13 is constructed of structural tubing and forms an inclined supporting frame for the evaporator coil. The face of the evaporator coil 7 is inclined away from a vertical orientation in such a way that its downstream face is situated below its upstream face, as shown in FIG. 1. A flat plate is welded to the bottom inclined side 15 of the evaporator coil mounting frame to prevent the inlet process air from by-passing the evaporator coil 7. Similarly, a panel 18 is inserted between the upper inclined side 16 of the evaporator coil mounting frame and the evaporator coil roof casing panel 17. The panel is flush against the evaporator coil 7 and sealed at both ends forming an air/liquid tight seal; thus, preventing the air/liquid from by-passing the evaporator coil 7 around the top. A splash baffle 19 is attached to the front edge of the evaporating coil mounting frame 13 forming a liquid seal for liquid droplets created by back splashing during the defrost cycle. The evaporating coil section is completely incased by panels, which are fully supported by the pan section bulkhead panels 20.

The evaporator coil section forms a sealed path forcing the inlet process air to be drawn over the inclined evaporator coil 7. Because the direction of air flow is normal to the evaporator coil face, there is a downward component of air flow velocity through the evaporator coil—that is, the air flow direction is not horizontal, but is angled downward. The air face velocity through the evaporator coil is about 500 to 650 fpm. In addition, the aqueous propylene glycol sprayed over the coil is forced through the evaporator coil 7, absorbing any frost accumulation, aided by the inherent air velocity and the force of gravity. The diluted aqueous propylene glycol solution drains into the pan section 45 and out the subsequent drain pan connection 21 upon exiting the evaporator coil 7.

Figures 8, 9:
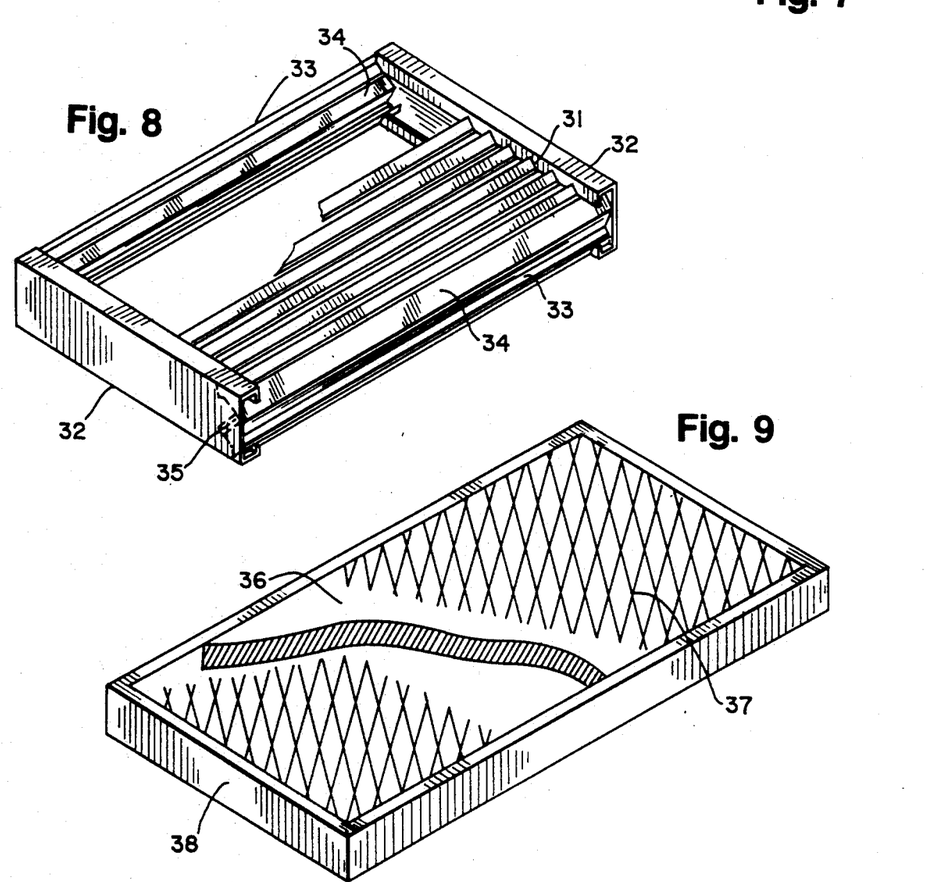
FIG. 8 is a detail of the primary eliminator.
FIG. 9 is a detail of the auxiliary eliminator.

The eliminator section is composed of an access door 30, a primary 22 and an auxiliary 23 set of impingement mist eliminators. As best illustrated in FIG. 8, the primary impingement mist eliminator 22 comprises a series of corrugated plates 31 compressed together, forming zig-zag passages for the air to pass through. The process air enters the primary mist eliminator at a high face fpm. The spacing between the corrugated plates 31 as well as the overall size of the corrugated plates 31 will be determined by the actual size of the evaporator coil used. The overall size of the spray cooler will also be determined by the actual size of the evaporator coil and, as discussed below, the primary and auxiliary mist eliminators should be sized to form an air/liquid tight seal to prevent any air/liquid from by-passing the mist eliminators.

As the air passes through the corrugated plates 31, it changes directions approximately five (5) times and any large airborne aqueous propylene glycol liquid droplets remaining at this point are impinged on the corrugated plates 31 due to the abrupt changes in the air flow direction. The entrapped aqueous propylene glycol liquid drains back to the drain pan 45 via gravity. The corrugated plates 31 are inserted into mating notches in the mist eliminator end plates 32. Block-off strips 33 are attached to the front and rear corrugated end plates 34 to prevent air by-passing. End plate clip angles 35 are utilized to attach the front and rear corrugated end plates 34 to the mist eliminator end plates 32; thereby, forming a rigid frame structure. The complete primary mist eliminator 22 assembly lies in a channel frame which is attached to the pan section bulkhead panels 20 and the evaporator coil casing roof panel 17. The channel frame forms an air/liquid tight seal preventing any air/liquid by-passing.

As illustrated in FIG. 9, the auxiliary mist eliminator comprises a flat sheet of woven wire mesh 36 incased between two flat sheets of diamond mesh 37, or equivalent. The air enters the auxiliary mist eliminator at a face velocity of about 400 fpm to 600 fpm, preferably 500 fpm. All three components are housed in a rectangular frame 38, which, as discussed above, is sized to prevent any air or liquid from by-passing the auxiliary mist eliminator. Any airborne aqueous propylene glycol liquid droplets still remaining are impinged on the woven wire mesh 36 as the air passes through. The rectangular frame 38 of the auxiliary impingement eliminator 23 lies in a channel frame which is attached to the pan section bulkhead panels 20 and the evaporator coil casing roof panel 17. The channel frame forms an air/liquid tight seal preventing any air/liquid by-passing. The auxiliary demister is particularly suited for applications where substantially complete removal of entrained droplets of aqueous propylene glycol is an important requirement. Where complete demisting is less critical, the primary demister alone can be utilized. Alternately, the auxiliary demister also can be utilized alone.

Figure 10:
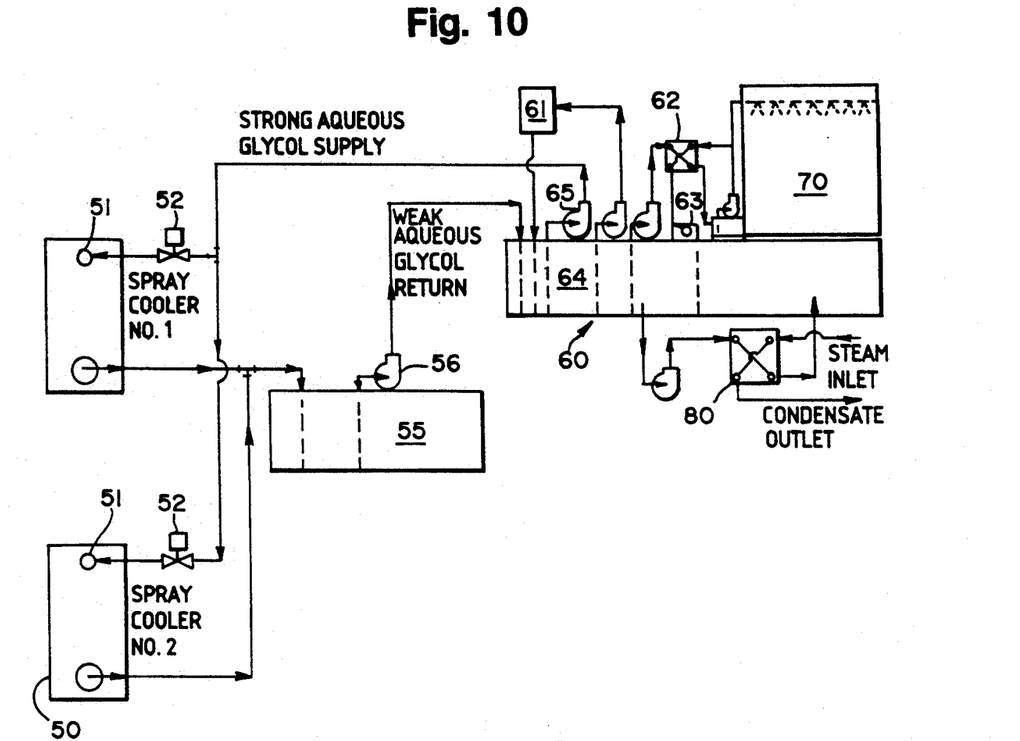
FIG. 10 is a layout including a plurality of spray coolers and the glycol concentration system.

FIG. 10 shows the layout of the refrigeration system. Two spray coolers 50 are shown (any number may be used) along with a system for concentrating the diluted (weak) aqueous propylene glycol solution and for returning concentrated (strong) aqueous propylene glycol to the spray cooler. The diluted aqueous propylene glycol solution that drains into the drain pan section and out through the drain pan connection 21 drains to a mini sump tank 55 where it is maintained at a temperature of between −20° F. volume). When the level of the diluted, cold aqueous propylene glycol solution in an optional mini sump tank 55 reaches a predetermined level, it is pumped to a concentrator/main sump unit by way of the mini sump pump 56. If the temperature of the aqueous propylene glycol solution in the main sump tank 64 drops below the prescribed range of between −20° F. and −25° F., it may be passed through a heat exchanger so and returned to the main sump tank. There, the concentration of the aqueous propylene glycol solution is continuously measured by passing a 1 gpm liquid sample from the main sump tank through a refractometer or a boiling pot analyzer 61. The refractometer 61 indirectly measures the concentration of the aqueous propylene glycol liquid sample. The concentrator cycle will be activated when the aqueous propylene glycol concentration drops below 58% (by volume). The boiling pot analyzer 61 activates and deactivates the concentrator cycle as the boiling point temperature drops below 226.8° F. and rises above 227.8° F., respectively.

Upon activation of the concentrator cycle, the weak aqueous propylene glycol solution is pumped from the main-sump tank through an economizer 62, in order to conserve energy, to the concentrator 70 at a rate of 2.5 gpm (nominal) per 100 pounds of water to be evaporated. An apparatus which is capable of concentrating aqueous propylene glycol is generally described in U.S. Pat. No. 4,608,119 to Rowland and U.S. Pat. No. 4,104,112 to Stutz. Simultaneously, the concentrated aqueous propylene glycol solution is pumped from the concentrator 70 through the economizer 62 and flow control box 63 back into the main sump tank 64. The concentrated (strong) aqueous propylene glycol solution is transferred by way of a pump 65 from the main sump tank 64 through a solenoid valve 52 into the spray inlet 51 in the spray cooler 50.

The damper section comprises a motor operated volume control damper 24, linkage and actuator 25. The volume control damper 24 is bolted to the fan section casing roof panel. The control volume damper is activated via a timer; thus, allowing a small portion of the inlet process air to by-pass the evaporator coil 7 and the eliminator section during the defrost cycle plus a predetermined time afterward, for a drip cycle. During this time duration of air by-passing, the air face velocity through the evaporator coil 7 of about 500 to 650 fpm and eliminator section is slightly decreased to about 450 to 550 fpm. The defrost cycle preferably lasts about 3 to 5 minutes, preferably about three minutes, followed by a drip cycle of about 15 to 60 minutes.

The fan section is composed of an access door 29 and a conventional centrifugal fan 26 belt driven by a conventional electric motor 27. The entire fan section is housed within the exterior casing. The fan shaft 39 is supported by two (2) end and one (1) intermediate pillow block bearing assemblies 40. The pillow block bearing assemblies 40 are mounted on individual 'A' frame structures 41 bolted to a rigid platform. The support platform is welded to the pan section bulkhead panels 20. The centrifugal fan housing is attached to a flex connection 28 through the floor of the fan section; thereby, allowing the conditioned process air to be discharged downward from the spray cooler. A conventional access door 29 is mounted in the side panel of the fan section casing for the purpose of servicing the various fan assembly components.

2. Vertical Embodiment

As can best be seen in FIG. 11, the spray cooler may also be configured in a vertical position. In the vertical spray cooler 50, the process air enters the top of the spray cooler rather than the side, as in the horizontal spray cooler. The process air then passes over the evaporator coil 7 before making a 180° turn. The concentrated (strong) food grade aqueous propylene glycol solution enters the spray pipe through connection 51 and is controlled by valve 52. As in the horizontal spray cooler, described above, the spray pipes and spray nozzles are arranged such that the inherent air velocity and the force of gravity insures that the food grade aqueous propylene glycol solution sprayed from the nozzles completely covers the evaporator coil.

After the process air completes the 180° turn, it encounters the primary 22 and auxiliary 23 mist eliminators, as in the horizontal spray cooler. In the vertical spray cooler, the drain connection 21 is located at the bottom of the 180° turn so that the liquid food grade aqueous propylene glycol solution will be easily collected. After the process air has passed through the primary and auxiliary mist eliminators, it enters the suction of the fan 26 and is discharged to the conditioned process space.

3. Method of Operation

In a typical horizontal or vertical system for refrigerating food products, cold air is provided to a conditioned space. Air returning from the conditioned space enters the spray cooler in the direction generally shown in FIG. 1 by the arrow and indicated by the letters A/F. The air is continuously drawn over the evaporator coil 7 at an entering coil face velocity of between about 500-650 fpm. The return air dry bulb temperature may range from about −30° F. to −45° F., with a mean refrigerant temperature in the evaporator coils between about −40° F. to −55° F. for freezing operations and higher temperature ranges for storage of products. During normal (non-defrosting) operation, the conditioned air then makes a 90° turn and exits out the bottom of the spray cooler as indicated by the arrow and the letters A/F in FIG. 1.

As the air is drawn over the evaporator coil, moisture in the air forms frost on the evaporator coil. Periodically the evaporator coils are defrosted. The period between defrost cycles depends upon the humidity of the process air, but ranges from approximately one to four hours. During the defrost cycle, the control volume damper 24 is activated by a timer, allowing a portion of the air to by-pass the evaporator coil 7. The air velocity through the evaporator coil 7 and eliminators 22 and 23 is thereby reduced from about 500 to 650 fpm to about 450 to 550 fpm. An aqueous propylene glycol solution is then sprayed from the spray nozzles 2, which are configured in a unique geometric pattern which in combination with the inherent air velocity results in a spray pattern covering the entire evaporator coil surface. The aqueous propylene glycol solution, 58%-60% (by vol.), enters the nozzle at an inlet pressure of about 15 psig. and at a loading of about 2.7 gpm (nominally) per sq. ft. of evaporator coil surface area for a duration of about 3 to 5 minutes, preferably for about three minutes. The aqueous propylene glycol solution absorbs the frost thus removing it from the evaporator coil. In doing so, the aqueous propylene glycol solution removes most moisture from the conditioned air, substantially inhibiting the growth of pathogenic bacteria, such as Listeria, Salmonella and Yersinia.

Next, the process air, now saturated with the aqueous propylene glycol solution, enters the elimination section. Due to the forces of gravity, most of the diluted aqueous propylene glycol liquid droplets drop into the drain pan 45 and drain out the subsequent drain pan connection 21. The remaining airborne droplets impinge on the corrugated plates 31 of the primary mist eliminator 22 due to the sharp changes in air flow direction through the primary eliminator. The liquid then drains into the drain pan 45 and out the drain connection 21.

Any remaining airborne diluted aqueous propylene glycol liquid droplets are impinged on the woven wire mesh 36 as the process air then passes through the auxiliary eliminator 23. This remaining liquid drains to the drain pan 45 by gravity. From there, the diluted aqueous propylene glycol enters the concentration system 60 as described above where it is reconcentrated for reintroduction into the spray cooler. A food grade of propylene glycol is used so that, in the unlikely event there is any carryover, it will not contaminate the food products being refrigerated.

The now clean, cold process air is then accelerated and directed by the fan back to the conditioned space to be used to freeze or store food products.

The foregoing description is illustrative and is not intended to limit the generality of our invention, which is defined by the following claims. For example, suitable frost absorbants other than propylene glycol that are known to those skilled in the art could be employed. Nozzles or droplet-producing means other than Vee-Jet ® nozzles could be employed in the spray cooler. And, various primary and auxiliary demisters could be used in place of those specifically described above.

We claim:

1. An apparatus for providing refrigerated process air, comprising:
   (a) an air refrigerator, comprising an inclined evaporator coil over which high face velocity process air passes in a direction having a downward velocity component;
   (b) means situated upstream of said evaporator coil for periodically spraying a liquid defrosting solution onto said evaporator coil to absorb frost which accumulates thereon;
   (c) means situated downstream of said evaporator coil for collecting said liquid defrosting solution;
   (d) demisting means for eliminating entrained liquid defrosting solution from the process air;
   (e) a housing surrounding said air refrigerator, said spraying means and said demisting means;
   whereby the high face velocity process air may be refrigerated continuously in an essentially frost-free manner.

2. The apparatus for providing refrigerated process air of claim 1, wherein said means for periodically spraying a liquid defrosting solution comprises a plurality of spray pipes, each of said spray pipes having a plurality of spray nozzles.

3. The apparatus for providing refrigerated process air of claim 2, wherein said spray pipes and said spray nozzles are so spaced such that said liquid defrosting solution may be sprayed through said nozzles to completely cover said evaporator coil and to absorb said frost from said evaporator coil.

4. The apparatus for providing refrigerated process air of claim 3, wherein said spray nozzles are opposed and staggered so that said liquid defrosting solution sprayed from opposing nozzles creates a constant plane of intersection, dispersing said solution into a mist of droplets.

5. The apparatus for providing refrigerated process air of claim 3, wherein said spray nozzles are spaced on approximately 5¼ to 7¼ inch centers.

6. The apparatus for providing refrigerated process air of claim 1, which said housing is sized to provide an air face velocity across said evaporator coil of about 500 to 650 fpm.

7. An apparatus for providing refrigerated process air, comprising:
   (a) an air refrigerator, comprising an inclined evaporator coil over which high velocity process air passes in a direction having a downward velocity component;
   (b) a plurality of spray pipes, situated upstream of said evaporator coil, each of said spray pipes having a plurality of spray nozzles for periodically spraying a food grade aqueous propylene glycol solution on said evaporator coil to absorb any frost which may accumulate thereon, said spray pipes and said spray nozzles being spaced such that said food grade aqueous propylene glycol solution may be sprayed through said nozzles to completely cover said evaporator coil, said spray nozzles being opposed and staggered, on 5¼ to 7¼ inch centers, so that said food grade aqueous propylene glycol solution sprayed from opposing nozzles creates a constant plane of intersection, dispensing said solution into a mist of droplets;
   (c) demisting means for eliminating any liquid aqueous propylene glycol particles which may become entrained in said process air;
   (d) a housing surrounding said air refrigerator, said spraying means and said demisting means, wherein said housing further comprises:
      (i) a process air inlet; and
      (ii) a process air outlet, said process air outlet being located at a 90° angle from said process air inlet;
   whereby said high velocity process air may be refrigerated in an essentially frost-free manner.

8. An apparatus for providing refrigerated process air, comprising:
   (a) an air refrigerator, comprising an evaporator coil over which high velocity process air passes in a direction substantially vertically downward;
   (b) a plurality of spray pipes, situated upstream of said evaporator coil, each of said spray pipes having a plurality of spray nozzles for periodically spraying a food grade aqueous propylene glycol solution on said evaporator coil to absorb any frost which may accumulate thereon, said spray pipes and said spray nozzles being spaced such that said food grade aqueous propylene glycol solution may be sprayed through said nozzles to completely cover said evaporator coil, said spray nozzles being opposed and staggered, on 5¼ to 7¼ inch centers, so that said food grade aqueous propylene glycol solution sprayed from opposing nozzles creates a constant plane of intersection, dispensing said solution into a mist of droplets;

(c) demisting means for eliminating any liquid aqueous propylene glycol particles which may become entrained in said process air;

(d) a housing surrounding said air refrigerator, said spraying means and said demisting means, wherein said housing is configured so that said process air makes a 180° turn after leaving said air refrigerator and before entering said demisting means, so that said process air enters said demisting means in a substantially vertically upward direction;

whereby said high velocity process air may be refrigerated in an essentially frost-free manner.

9. An apparatus for providing refrigerated process air, comprising:

(a) an air refrigerator, comprising an inclined evaporator coil over which high velocity process air passes in a direction having a downward velocity component;

(b) means situated upstream of said evaporator coil for periodically spraying a liquid defrosting solution on said evaporator coil to absorb any frost which may accumulate thereon;

(c) means situated downstream of said evaporator coil for collecting said liquid defrosting solution;

(d) a primary demister for eliminating any liquid defrosting solution droplets which may become entrained in said high velocity process air;

(e) a housing surrounding said air refrigerator, sized to provide an air face velocity across said evaporator coil of about 500 to 650 fpm;

whereby said high velocity process air may be refrigerated in an essentially frost-free manner.

10. The apparatus for providing refrigerated process air of claim 9, wherein said housing is sized to provide an air face velocity across said primary demister of about 400 to 600 fpm.

11. The apparatus for providing refrigerated process air of claim 9, wherein said primary demister comprises a series of corrugated plates forming zig-zag passages for said process air to pass through;

whereby said liquid defrosting solution droplets entrained in said high velocity process air impinge on said corrugated plates.

12. The apparatus for providing refrigerated process air of claim 11, wherein said corrugated plates are spaced approximately one (1) inch apart.

13. The apparatus for providing refrigerated process air of claim 11, wherein said corrugated plates are housed in a rigid frame structure.

14. The apparatus for providing refrigerated process air of claim 13, wherein said rigid frame structure forms an air/liquid tight seal preventing any air/liquid from by-passing said primary demister.

15. An apparatus for providing refrigerated process air, comprising:

(a) an air refrigerator, comprising an inclined evaporator coil over which high velocity process air passes in a direction having a downward velocity component;

(b) means situated upstream of said evaporator coil for periodically spraying a food grade aqueous propylene glycol solution on said evaporator coil to absorb any frost which may accumulate thereon;

(c) means situated downstream of said evaporator coil for collecting said liquid defrosting solution;

(d) a primary demister for eliminating any liquid aqueous propylene glycol particles which may become entrained in said high velocity process air, wherein said primary demister further comprises a plurality of corrugated plates, forming zig-zag passages of said process air to pass through, said corrugated plates being spaced approximately one (1) inch apart and being housed in a rigid frame structure which forms an air/liquid tight seal preventing any air/liquid from by-passing said primary demister;

(e) a housing surrounding said air refrigerator, said spraying means and said demisting means, said housing sized to provide air face velocities of about 500 to 560 fpm across said evaporator coil and about 400 to 600 fpm across said primary demister, said housing further comprising:

(i) a process air inlet; and (ii) a process air outlet, said process air outlet being located at a 90° angle from said process air inlet;

whereby said high velocity process air may be refrigerated in an essentially frost-free manner.

16. An apparatus for providing refrigerated process air, comprising:

(a) an air refrigerator, comprising an evaporator coil over which high velocity process air passes in a direction substantially vertically downward;

(b) means situated upstream of said evaporator coil for periodically spraying and for collecting a food grade aqueous propylene glycol solution on said evaporator coil to absorb any frost which may accumulate thereon;

(c) a primary demister for eliminating any liquid aqueous propylene glycol particles which may become entrained in said high velocity process air, wherein said primary demister further comprises a plurality of corrugated plates, forming zig-zag passages of said process air to pass through, said corrugated plates being spaced approximately one (1) inch apart and being housed in a rigid frame structure which forms an air/liquid tight seal preventing any air/liquid from by-passing said primary demister;

(d) a housing surrounding said air refrigerator, said spraying means and said demisting means, said housing sized to provide air face velocities of about 500 to 560 fpm across said evaporator coil and about 400 to 600 fpm across said primary demister, wherein said housing is configured so that said process air makes a 180° turn after leaving said air refrigerator and before entering said primary demister, so that said process air enters said demisting means in a substantially vertically upward direction;

whereby said high velocity process air may be refrigerated in an essentially frost-free manner.

17. An apparatus for providing refrigerated process air, comprising:

(a) an air refrigerator, comprising an evaporator coil over which high velocity process air passes in a direction substantially vertically downward;

(b) means situated upstream of said evaporator coil for periodically spraying a liquid defrosting solution on said evaporator coil to absorb any frost which may accumulate thereon;

(c) means situated downstream of said evaporator coil for collecting said liquid defrosting solution;

(d) a primary demister for eliminating any liquid defrosting solution droplets which may become entrained in said high velocity process air;
(e) an auxiliary demister for eliminating any liquid defrosting solution droplets which may become entrained in said high velocity process air;
(f) a housing surrounding said air refrigerator, said spraying means and said primary and auxiliary demisters;
wherein said high velocity process air may be refrigerated in an essentially frost-free manner.

18. The apparatus for providing refrigerated process air of claim 17, wherein said housing is sized to provide an air face velocity across said auxiliary demister of about 400 to 600 fpm.

19. The apparatus for providing refrigerated process air of claim 17, wherein said auxiliary demister comprises at least one sheet of wire mesh.

20. The apparatus for providing refrigerated process air of claim 17, wherein said auxiliary demister comprises:
(a) at least two sheets of diamond mesh;
(b) at least one sheet of woven wire mesh encased between said diamond mesh sheets;
whereby said liquid defrosting solution droplets entrained in said high velocity process air impinge on said sheets of mesh.

21. The apparatus for providing refrigerated process air of claim 20, further comprising a frame structure for housing said sheets of diamond mesh and said sheet of woven wire mesh.

22. The apparatus for providing refrigerated process air of claim 21, wherein said frame structure forms an air/liquid tight seal preventing any air/liquid from by-passing said auxiliary demister.

23. An apparatus for providing refrigerated process air comprising:
(a) an air refrigerator, comprising an evaporator coil over which high velocity process air passes;
(b) means for periodically spraying and for collecting a food grade aqueous propylene glycol solution on said evaporator coil to absorb any frost which may accumulate thereon;
(c) an auxiliary demister for eliminating any liquid aqueous propylene glycol particles which may become entrained in said high velocity process air, wherein said auxiliary demister further comprises:
(i) at least two sheets of diamond mesh;
(ii) at least one sheet of woven wire mesh encased between said diamond mesh sheets; and
(iii) a frame structure for housing said sheets of diamond mesh and said sheet of woven wire mesh, said frame structure forming an air/liquid tight seal preventing any air/liquid from by-passing said auxiliary demister;
(d) a housing surrounding said air refrigerator, said spraying means and said demisting means, said housing sized to provide air face velocities of about 500 to 650 fpm across said evaporator coil and about 400 to 600 fpm across said auxiliary demister, said housing further comprising:
(i) a process air inlet; and
(ii) a process air outlet, said process air outlet being located at a 90° angle from said process air inlet;
whereby said high velocity process air may be refrigerated in an essentially frost-free manner.

24. An apparatus for providing refrigerated process air comprising:
(a) an air refrigerator, comprising an evaporator coil over which high velocity process air passes;
(b) means for periodically spraying and for collecting a food grade aqueous propylene glycol solution on said evaporator coil to absorb any frost which may accumulate thereon;
(c) an auxiliary demister for eliminating any liquid aqueous propylene glycol particles which may become entrained in said high velocity process air, wherein said auxiliary demister further comprises:
(i) at least two sheets of diamond mesh;
(ii) at least one sheet of woven wire mesh encased between said diamond mesh sheets; and
(iii) a frame structure for housing said sheets of diamond mesh and said sheet of woven wire mesh, said frame structure forming an air/liquid tight seal preventing any air/liquid from by-passing said auxiliary demister;
(d) a housing surrounding said air refrigerator, said spraying means and said demisting means, said housing sized to provide air face velocities of about 500 to 650 fpm across s id evaporator coil and about 400 to 600 fpm across said auxiliary demister, wherein said housing is configured so that said process air makes a 180° turn after leaving said air refrigerator and before entering said auxiliary demister
whereby said high velocity process air may be refrigerated in an essentially frost-free manner.

25. An apparatus for providing refrigerated process air, comprising:
(a) an air refrigerator, comprising an inclined evaporator coil over which high velocity process air passes in a direction having a downward velocity component;
(b) means situated upstream of said evaporator coil for periodically spraying and for collecting a liquid defrosting solution on said evaporator coil to absorb any frost which may accumulate thereon;
(c) demisting means for eliminating any liquid defrosting solution droplets which may become entrained in said high velocity process air, wherein said demisting means comprises a primary demister and an auxiliary demister;
(d) a housing surrounding said air refrigerator, said spraying means and said demisting means;
whereby said high velocity process air may be refrigerated in an essentially frost-free manner.

26. The apparatus for providing refrigerated process air of claim 25, wherein said housing is sized to provide an air face velocity across said primary demister and said auxiliary demister of about 400 to 600 fpm.

27. The apparatus for providing refrigerated process air of claim 25, wherein said primary demister comprises a series of corrugated plates forming zig-zag passages of said process air to pass through;
whereby said liquid aqueous propylene glycol particles entrained in said high velocity process air impinge on said corrugated plates.

28. The apparatus for providing refrigerated process air of claim 27 wherein said corrugated plates are spaced approximately one (1) inch apart.

29. The apparatus for providing refrigerated process air of claim 27, wherein said corrugated plates are housed in a rigid frame structure.

30. The apparatus for providing refrigerated process air of claim 29, wherein said rigid frame structure forms an air/liquid tight seal preventing any air/liquid from by-passing said primary demister.

31. The apparatus for providing refrigerated process air of claim 25, wherein said auxiliary demister comprises at least one sheet of wire mesh.

32. The apparatus for providing refrigerated process air of claim 25, wherein said auxiliary demister comprises:
   (a) at least two sheets of diamond mesh;
   (b) at least one sheet of woven wire mesh encased between said diamond mesh sheets
   whereby said liquid aqueous propylene glycol particles entrained in said high velocity process air impinge on said sheets of mesh.

33. The apparatus for providing refrigerated process air of claim 32, further comprising a frame structure for housing said sheets of diamond mesh and said sheet of woven wire mesh.

34. The apparatus for providing refrigerated process air of claim 33, wherein said frame structure forms an air/liquid tight seal preventing any air/liquid from by-passing said auxiliary demister.

35. An apparatus for providing refrigerated process air, comprising:
   (a) an air refrigerator, comprising an evaporator coil over which high velocity process air passes;
   (b) means for periodically spraying and for collecting a food grade aqueous propylene glycol solution on said evaporator coil to absorb any frost which may accumulate thereon;
   (c) demisting means for eliminating any liquid aqueous propylene glycol particles which may become entrained in said high velocity process air, wherein said demisting means comprises a primary demister and an auxiliary demister,
      (i) said primary demister comprising a series of corrugated plates, spaced approximately one (1) inch apart, forming zig-zag passages of said process air to pass through, said corrugated plates being housed in a rigid frame structure which forms an air/liquid tight seal preventing any air/liquid from by-passing said primary demister;
      (ii) said auxiliary demister comprising
         at least two sheets of diamond mesh;
         at least one sheet of woven wire mesh encased between said diamond mesh sheets; and
         a frame structure for housing said sheets of diamond mesh and said sheet of woven wire mesh, said frame structure forming an air/liquid tight seal preventing any air/liquid from by-passing said auxiliary demister;
   (d) a housing surrounding said air refrigerator, said spraying means and said demisting means, said housing sized to provide air face velocities across said primary and auxiliary demisters of about 400 to 600 fpm, and across said evaporator coil of about 500 to 650 fpm, said housing further comprising:
      (i) a process air inlet; and
      (ii) a process air outlet, said process air outlet being located at a 90° angle from said process air inlet;
   whereby said high velocity process air may be refrigerated in an essentially frost-free manner.

36. An apparatus for providing refrigerated process air, comprising:
   (a) an air refrigerator, comprising an evaporator coil over which high velocity process air passes;
   (b) means for periodically spraying and for collecting a food grade aqueous propylene glycol solution on said evaporator coil to absorb any frost which may accumulate thereon;
   (c) demisting means for eliminating any liquid aqueous propylene glycol particles which may become entrained in said high velocity process air, wherein said demisting means comprises a primary demister and an auxiliary demister,
      (i) said primary demister comprising a series of corrugated plates, spaced approximately one (1) inch apart, forming zig-zag passages of said process air to pass through, said corrugated plates being housed in a rigid frame structure which forms an air/liquid tight seal preventing any air/liquid from by-passing said primary demister;
      (ii) said auxiliary demister comprising
         at least two sheets of diamond mesh;
         at least one sheet of woven wire mesh encased between said diamond mesh sheets; and
         a frame structure for housing said sheets of diamond mesh and said sheet of woven wire mesh, said frame structure forming an air/liquid tight seal preventing any air/liquid from by-passing said auxiliary demister;
   (d) a housing surrounding said air refrigerator, said spraying means and said demisting means, said housing sized to provide air face velocities across said primary and auxiliary demisters of about 400 to 600 fpm, and across said evaporator coil of about 500 to 650 fpm, wherein said housing is configured so that said process air makes a 180° turn after leaving said air refrigerator and before entering said demisting means:
   whereby said high velocity process air may be refrigerated in an essentially frost-free manner.

37. An apparatus for providing refrigerated process air, comprising:
   (a) an air refrigerator, comprising an evaporator coil over which high velocity process air passes;
   (b) a plurality of spray pipes, each of said spray pipes having a plurality of spray nozzles for spraying a food grade aqueous propylene glycol solution on said evaporator coil to absorb any frost which may accumulate thereon, said spray pipes and said spray nozzles being so spaced such that said food grade aqueous propylene glycol solution may be sprayed through said nozzles to completely cover said evaporator coil, said spray nozzles being staggered, on 5½ to 7½ inch centers, so that said food grade aqueous propylene glycol solution sprayed therefrom creates a constant plane of intersection;
   (c) demisting means for eliminating any liquid aqueous propylene glycol particles which may become entrained in said process air, wherein said demisting means comprises a primary demister and an auxiliary demister,
      (i) said primary demister comprising a series of corrugated plates, spaced approximately one (1) inch apart, forming zig-zag passages of said process air to pass through, said corrugated plates being housed in a rigid frame structure which forms an air/liquid tight seal preventing any air/liquid from by-passing said primary demister;
      (ii) said auxiliary demister comprising;
         at least two sheets of diamond mesh;
         at least one sheet of woven wire mesh encased between said diamond mesh sheets; and
         a frame structure for housing said sheets of diamond mesh and said sheet of woven wire mesh, said frame structure forming an air/liquid tight seal preventing any air/liquid from by-passing said auxiliary demister;
(d) a housing surrounding said air refrigerator, said spraying means and said demisting means, said housing sized to provide air face velocities across said primary and auxiliary demisters of about 400 to 600 fpm and across said evaporator coil of about 500 to 650 fpm, said housing further comprising, a process air inlet and a process air outlet, said process air outlet being located at a 90° angle from said process air inlet;
whereby said high velocity process air may be refrigerated in an essentially frost-free manner.

38. An apparatus for providing refrigerated process air, comprising:
(a) an air refrigerator, comprising an evaporator coil over which high velocity process air passes;
(b) a plurality of spray pipes, each of said spray pipes having a plurality of spray nozzles for spraying a food grade aqueous propylene glycol solution on said evaporator coil to absorb any frost which may accumulate thereon, said spray pipes and said spray nozzles being so spaced such that said food grade aqueous propylene glycol solution may be sprayed through said nozzles to completely cover said evaporator coil, said spray nozzles being staggered, on 5½ to 7½ inch centers, so that said food grade aqueous propylene glycol solution sprayed therefrom creates a constant plane of intersection;
(c) demisting means for eliminating any liquid aqueous propylene glycol particles which may become entrained in said process air, wherein said demisting means comprises a primary demister and an auxiliary demister,
(i) said primary demister comprising a series of corrugated plates, spaced approximately one (1) inch apart, forming zig-zag passages of said process air to pass through, said corrugated plates being housed in a rigid frame structure which forms an air/liquid tight seal preventing any air/liquid from by-passing said primary demister;
(ii) said auxiliary demister comprising;
at least two sheets of diamond mesh;
at least one sheet of woven wire mesh encased between said diamond mesh sheets; and
a frame structure for housing said sheets of diamond mesh and said sheet of woven wire mesh, said frame structure forming an air/liquid tight seal preventing any air/liquid from by-passing said auxiliary demister;
(d) a housing surrounding said air refrigerator, said spraying means and said demisting means, said housing sized to provide air face velocities across said primary and auxiliary demisters of about 400 to 600 fpm and across said evaporator coil of about 500 to 650 fpm, said housing further being configured so that said process air makes a 180° turn after leaving said air refrigerator and before entering said demisting means;
whereby said high velocity process air may be refrigerated in an essentially frost-free manner.

39. A method of providing refrigerated process air, comprising the steps of:
(a) drawing high velocity process air over an inclined evaporator coil in a direction having a downward velocity component;
(b) periodically spraying a liquid defrosting solution, from spray nozzles located on spray pipes situated upstream of the evaporator coil, onto the evaporator coil to absorb any frost which may accumulate thereon;
(c) eliminating substantially all entrained liquid defrosting solution particles from said process air;
whereby said high velocity air may be refrigerated in an essentially frost-free manner.

40. The method of providing refrigerated process air of claim 39, wherein the air face velocity across said evaporator coil of about 500 to 650 fpm.

41. The method of providing refrigerated process air of claim 39, wherein said liquid defrosting solution is sprayed on said evaporator coil for approximately three (3) to five (5) minutes.

42. The method of providing refrigerated process air of claim 41, wherein said spray nozzles are opposed and staggered so that said liquid defrosting solution sprayed therefrom creates a constant plane of intersection.

43. The method of providing refrigerated process air of claim 39, wherein said liquid defrosting solution is an aqueous propylene glycol solution, approximately 58-60% propylene glycol by volume.

44. The method of providing refrigerated process air of claim 43, wherein said aqueous propylene glycol solution is provided to said spray nozzles at an inlet pressure of about 15 psig. and at a loading of about 2.7 gpm (nominally) per sq. ft. of evaporator coil surface area.

45. The method of providing refrigerated process air of claim 39, further comprising the step of draining said liquid defrosting solution by gravity.

46. The method of providing refrigerated process air of claim 45, further comprising the step of collecting said liquid defrosting solution below said evaporator coils.

47. A method of providing refrigerated process air, comprising the steps of:
(a) drawing high velocity process air over an evaporator coil, at air face velocity across said evaporator coil of about 500 to 650 fpm;
(b) spraying liquid defrosting solution on the evaporator coil, for approximately three (3) to five (5) minutes, from spray nozzles which are staggered on spray pipes so that said liquid defrosting solution sprayed therefrom creates constant plane of intersection and completely covers said evaporator coil, to absorb any frost which may accumulate thereon;
(c) eliminating any entrained liquid defrosting solution particles from said process air;
whereby said high velocity process air may be refrigerated in an essentially frost-free manner.

48. A method of providing refrigerated process air, comprising the steps of:
(a) drawing high velocity process air over an inclined evaporator coil in a direction having a downward velocity component;
(b) periodically spraying a liquid defrosting solution on the evaporator coil from a location upstream of the evaporator coil to absorb any frost which may accumulate thereon;
(c) eliminating any entrained liquid defrosting solution particles from said process air by passing said process air through a primary demister;
whereby said high velocity process air may be refrigerated in an essentially frost-free manner.

49. The method of providing refrigerate process air of claim 48, wherein said process air changes direction approximately five (5) times as it passes through said primary demister.

50. A method of providing refrigerated process air, comprising the steps of:
   (a) drawing high velocity process air over an inclined evaporator coil in a direction having a downward velocity component;
   (b) periodically spraying a liquid defrosting solution onto the evaporator coil from a location upstream of the evaporator coil to absorb any frost which may accumulate thereon;
   (c) eliminating any entrained liquid defrosting solution particles from said process air by passing said process air through a primary demister;
   whereby said high velocity process air may be refrigerated in an essentially frost-free manner.

51. A method of providing refrigerated process air, comprising the steps of:
   (a) drawing high velocity process air over an inclined evaporator coil in a direction having a downward velocity component;
   (b) periodically spraying a liquid defrosting solution onto the evaporator coil from a location upstream of the evaporator coil to absorb any frost which may accumulate thereon;
   (c) eliminating any entrained liquid defrosting solution particles from said process air by passing said process air through a primary demister and an auxiliary demister;
   whereby said high velocity process air may be refrigerated in an essentially frost-free manner.

52. The method of providing refrigerated process air of claim 51, wherein said process air enters said primary demister at a face velocity of approximately 450 to 550 fpm.

53. A method of providing refrigerated process air, comprising the steps of:
   (a) drawing high velocity process air over an evaporator coil;
   (b) reducing the velocity of said process air;
   (c) spraying a liquid defrosting solution on the evaporator coil to absorb any frost which may accumulate thereon;
   (d) eliminating any entrained liquid defrosting solution particles from said process air; and
   (e) increasing the velocity of said process air;
   whereby said high velocity process air may be refrigerated in an essentially frost-free manner.

54. The method of providing refrigerated process air of claim 53, wherein the step of reducing the velocity of said process air comprises bypassing a portion of said process air around said evaporator coil.

55. The method of providing refrigerated process air of claim 53, wherein said step of reducing the velocity of said process air comprises passing a portion of said process air through a volume control damper.

56. The method of providing refrigerated process air of claim 55, wherein the velocity of said process air is reduced to approximately 450 to 550 fpm across said evaporator coil.

57. The method of providing refrigerated process air of claim 53, wherein said liquid defrosting solution is sprayed on said evaporator coil for approximately three (3) to five (5) minutes.

58. The method of providing refrigerated process air of claim 53, further comprising, allowing said liquid defrosting solution to drain by gravity.

59. The method of providing refrigerated process air of claim 53, allowing said liquid defrosting solution to drain for approximately 15 to 60 minutes before increasing the velocity of said process air.

60. The method of providing refrigerated process air of claim 58, further comprising collecting said liquid defrosting for reconcentration.

61. A method of providing refrigerated process air, comprising the steps of:
   (a) drawing high velocity process air over an evaporator coil at approximately 500 to 650 fpm;
   (b) initiating a defrost cycle by reducing the velocity of said process air to approximately 450 to 550 fpm across said evaporator coil, by bypassing a portion of said process air around said evaporator coil through a volume control damper;
   (c) spraying a liquid defrosting solution on the evaporator coil for about three (3) to five (5) minutes, to absorb any frost which may accumulate thereon, said liquid defrosting solution being sprayed through spray nozzles located on spray pipes, said liquid defrosting solution being provided to said spray nozzles at an inlet pressure of 15 psig. at a loading of about 2.7 gpm (nominally) per sq. ft. of evaporator coil surface area;
   (d) eliminating any entrained liquid defrosting solution particles from said process air by passing said process air through a primary demister and an auxiliary demister;
   (e) allowing said liquid defrosting solution to drain by gravity for approximately 15 to 60 minutes;
   (f) ending said defrost cycle by closing said volume control damper which increases the velocity of said process air to 500 to 650 fpm across said evaporator coil; whereby said high velocity process air may be refrigerated in an essentially frost-free manner.

* * * * *

UNITED STATES PATENT AND TRADEMARK OFFICE
CERTIFICATE OF CORRECTION

PATENT NO. : 5,249,433
DATED : October 5, 1993
INVENTOR(S) : Edward R. Hardison, et. al.

It is certified that error appears in the above-indentified patent and that said Letters Patent is hereby corrected as shown below:

On the Title page, item [75], inventor's name should read--Randolph S. Cool.

Signed and Sealed this

Twenty-sixth Day of April, 1994

Attest:

BRUCE LEHMAN

Attesting Officer

Commissioner of Patents and Trademarks